C. C. WHITTAKER.
CONTROL SYSTEM AND APPARATUS.
APPLICATION FILED FEB. 13, 1920.

1,366,141.

Patented Jan. 18, 1921.

WITNESSES:
J. A. Helsel
W. R. Coley

INVENTOR
Charles C. Whittaker
BY
Wesley G. Carr
ATTORNEY

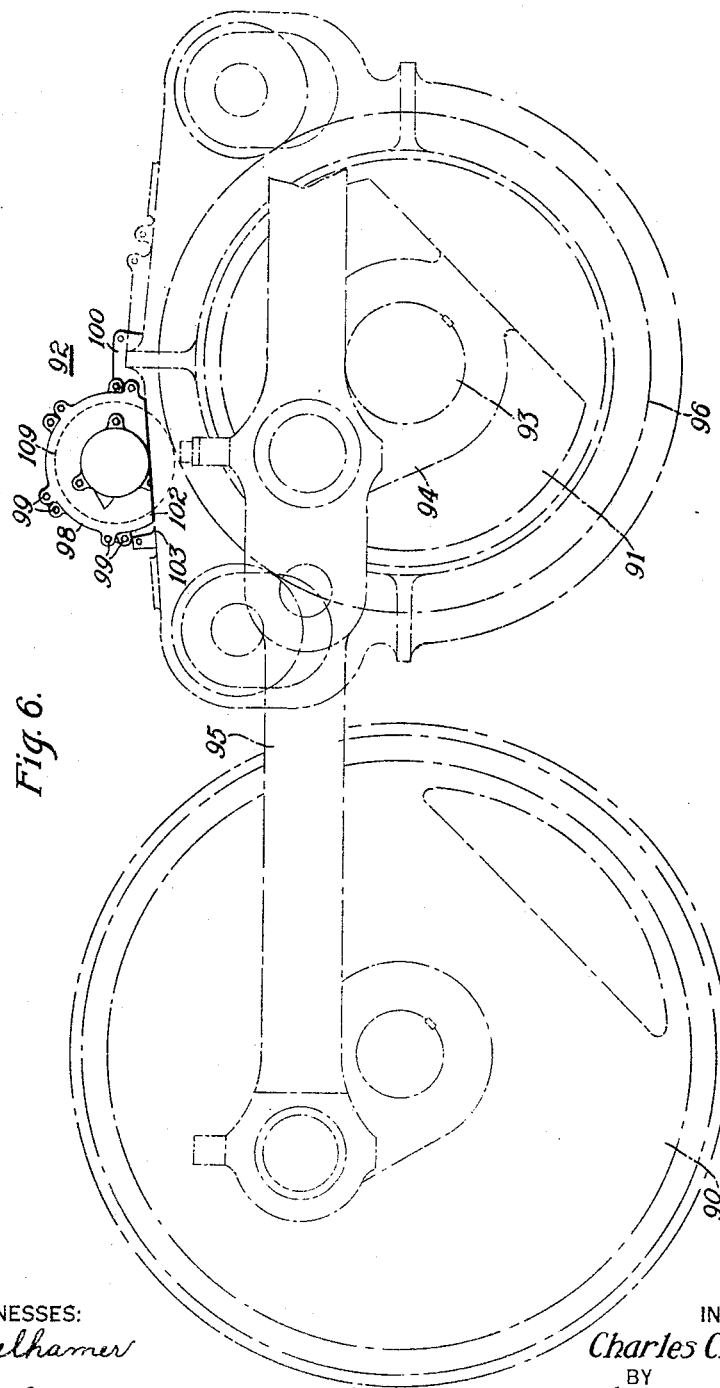

C. C. WHITTAKER.
CONTROL SYSTEM AND APPARATUS.
APPLICATION FILED FEB. 13, 1920.
1,366,141.
Patented Jan. 18, 1921.
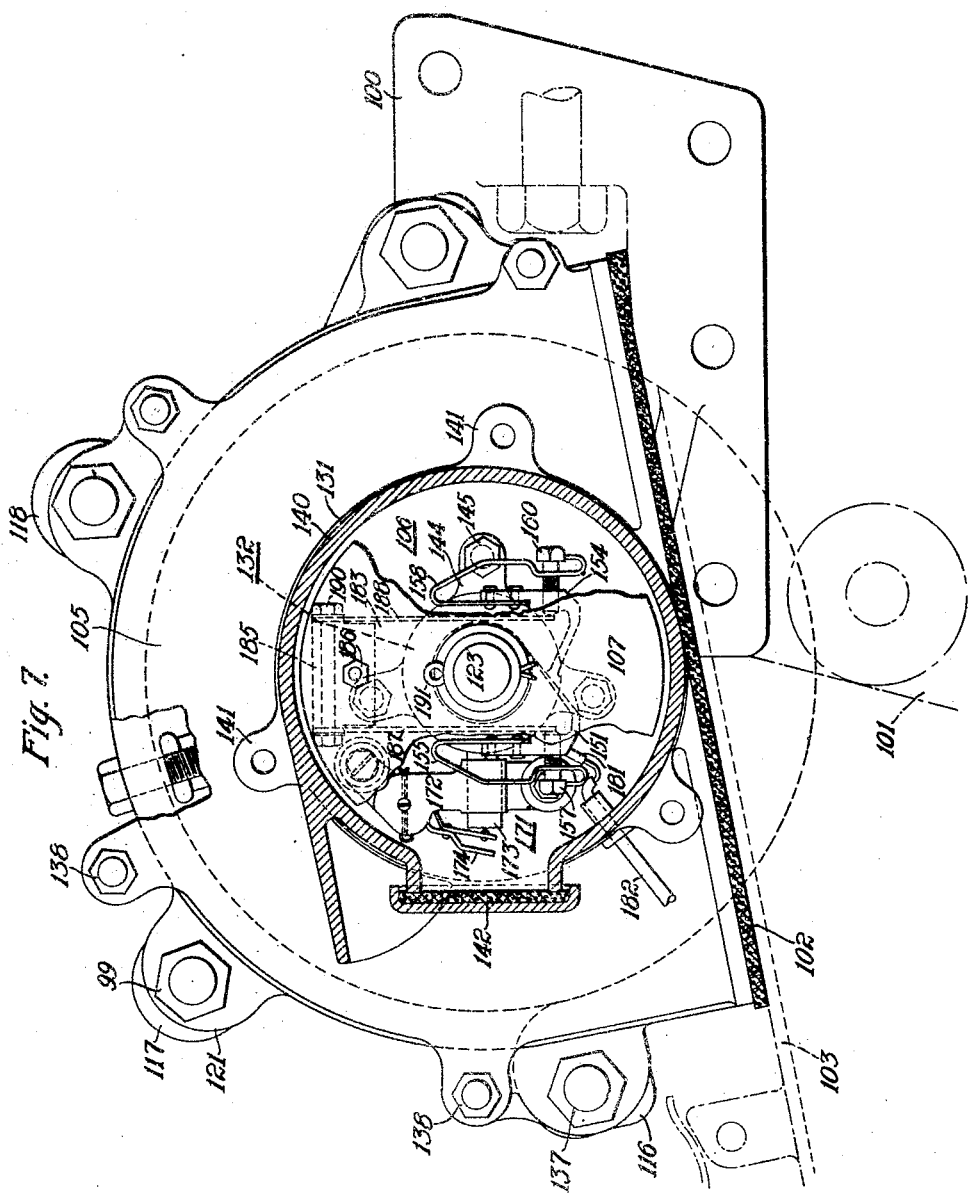
WITNESSES:
INVENTOR
Charles C. Whittaker
BY
ATTORNEY

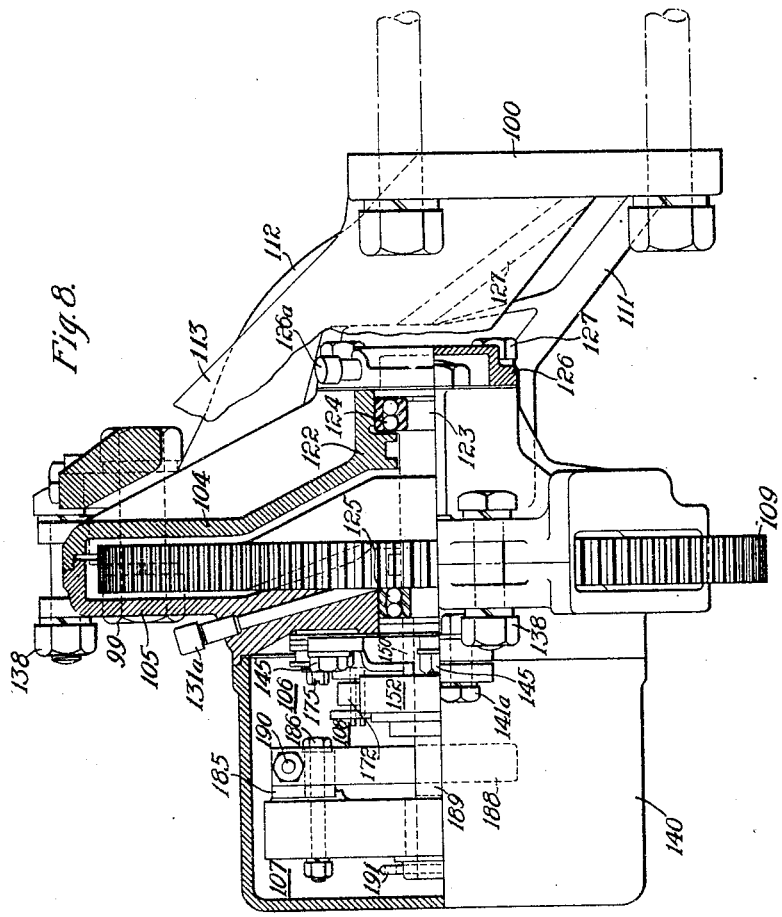

C. C. WHITTAKER.
CONTROL SYSTEM AND APPARATUS.
APPLICATION FILED FEB. 13, 1920.
1,366,141.                                              Patented Jan. 18, 1921.
7 SHEETS—SHEET 5.
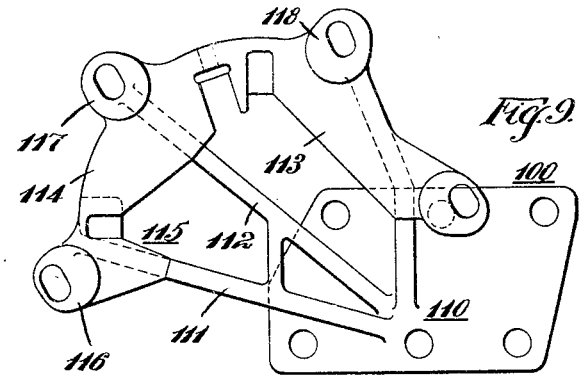
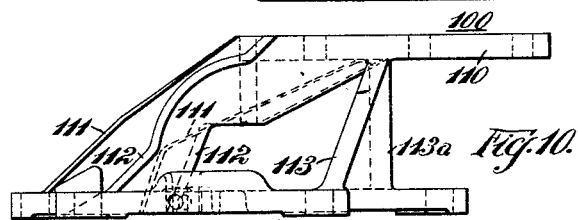
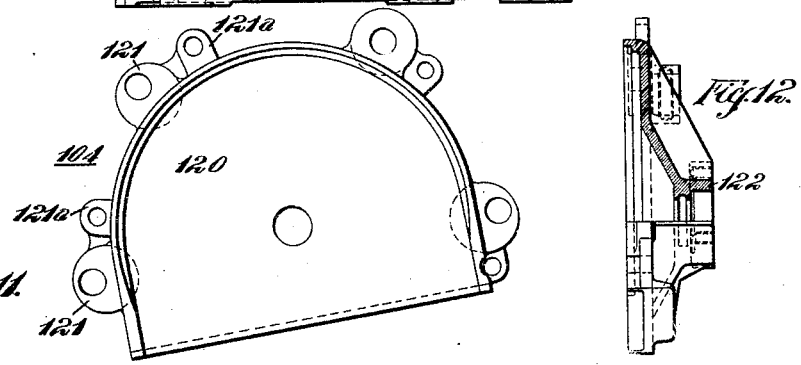
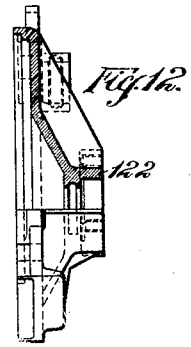
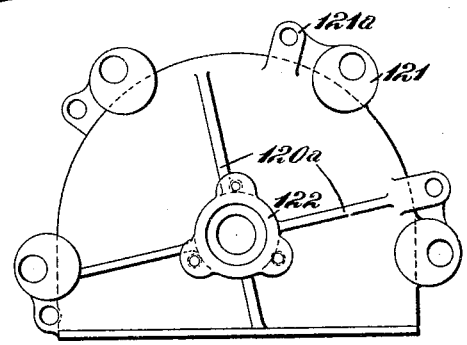
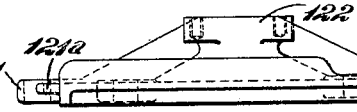
WITNESSES:
J. P. Wurmb.
W. R. Coley
INVENTOR
Charles C. Whittaker
BY
Wesley G. Carr
ATTORNEY C. C. WHITTAKER.
CONTROL SYSTEM AND APPARATUS.
APPLICATION FILED FEB. 13, 1920.
1,366,141.  Patented Jan. 18, 1921.
7 SHEETS—SHEET 6.
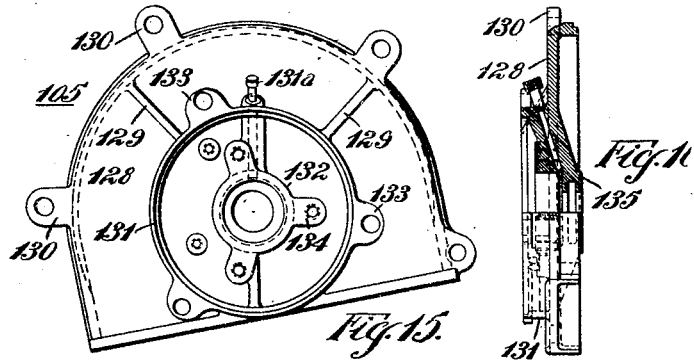
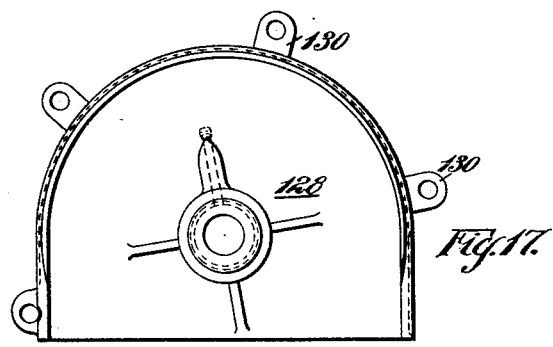
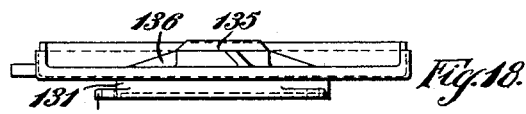
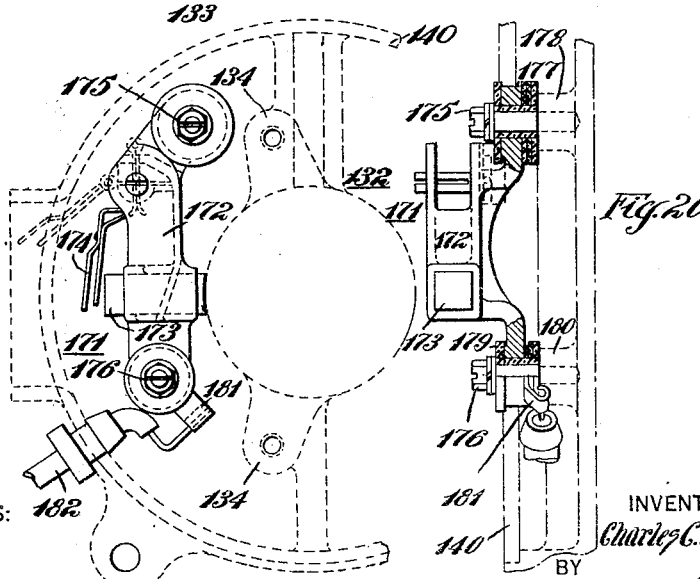

C. C. WHITTAKER.
CONTROL SYSTEM AND APPARATUS.
APPLICATION FILED FEB. 13, 1920.
1,366,141.
Patented Jan. 18, 1921.
7 SHEETS—SHEET 7.
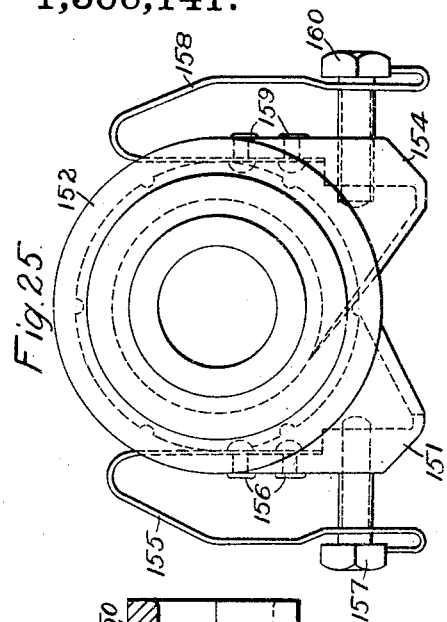
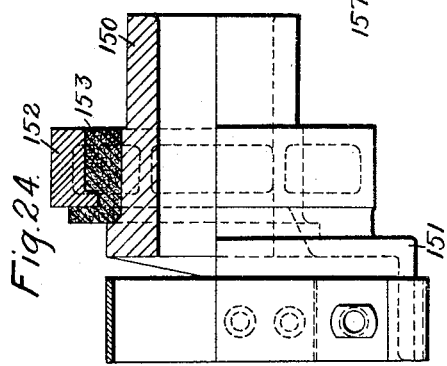
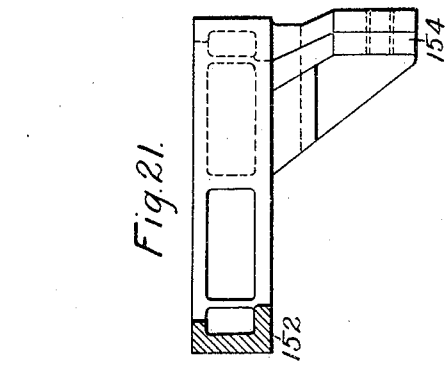
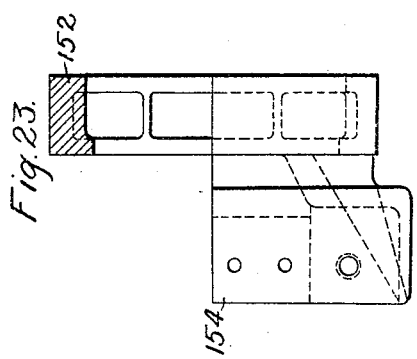
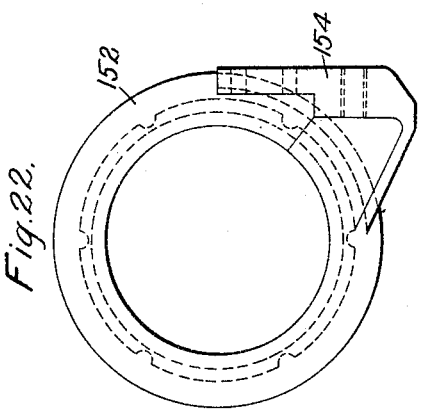
WITNESSES:
J. A. Helsel
W. R. Coley
INVENTOR
Charles C. Whittaker.
BY
Wesley G. Carr
ATTORNEY

UNITED STATES PATENT OFFICE.

CHARLES C. WHITTAKER, OF PITTSBURGH, PENNSYLVANIA.

CONTROL SYSTEM AND APPARATUS.

1,366,141.    Specification of Letters Patent.    Patented Jan. 18, 1921.

Application filed February 13, 1920. Serial No. 358,412.

*To all whom it may concern:*

Be it known that I, CHARLES C. WHITTAKER, a citizen of the United States, and a resident of Pittsburgh, in the county of Allegheny and State of Pennsylvania, have invented a new and useful Improvement in Control Systems and Apparatus, of which the following is a specification.

My invention relates to control systems and apparatus and it has special relation to the automatic control of electric locomotives and the like under conditions of incipient wheel slippage.

As is well known to those familiar with electric locomotive operation, considerable trouble and expense is caused by the "slipping" of vehicle wheels, that is, the relatively rapid rotation of wheels without gripping the rails. Such action results in excessive wear of the wheels and in the formation of "cups" in the rails, as well as causing the slipping motor to temporarily lose its torque and thus throw an excessive load upon the other driving motors.

A still greater operating trouble, directly traceable to such wheel slippage, is the severe strain and more or less prevalent breakages of driving mechanism parts by reason of the so-called "chattering wheel slip;" that is, the repeated alternate tension and compression to which the driving mechanisms are subjected as a driving wheel successively slips and grips the rail during periods of application of torque by the motors.

It is one object of my invention, therefore, to provide means immediately responsive to the slipping of a vehicle wheel for eliminating such slippage and restoring normal operating conditions.

More specifically stated, it is the object of my invention to provide an effective, reliable, rugged and conveniently assembled slip-arrester that is adapted for ready installation upon existing electric locomotives and the like.

Viewed from another angle, it is an object of my invention to provide a device of the class in question wherein an inertia disk, that is caused to rotate by a torque transmitted to it through springs, deflects these springs by virtue of its inertia whenever its rate of angular velocity, by reason of wheel slippage, is changed.

The operating principles and preferred construction of my slip-arrester may best be understood by reference to the accompanying drawings, wherein—

Fig. 6 is an assembly view showing the installation of my slip-arrester in connection with the driving mechanism of an electric locomotive;

Fig. 7 is a view, partially in end elevation and partially in section, of my slip-arrester;

Fig. 8 is a view, partially in side elevation and partially in longitudinal section, thereof; and Figs. 9 to 25, inclusive, are detail views of various forms serving to more clearly illustrate the preferred construction of the different elements composing my slip-arrester, Figs. 9 to 20, inclusive, being drawn to a smaller scale.

Figure 1:
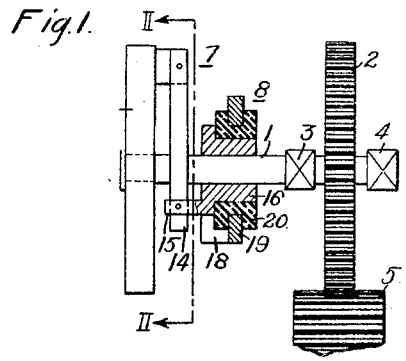
Figure 1 is a simplified view, partially in elevation and partially in section, of a device constructed in accordance with my present invention.
Figure 2:
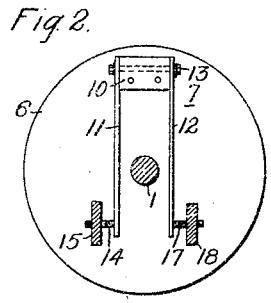
Fig. 2 and Fig. 3 are sectional views, taken along the line II—II of Fig. 1, showing the positions of certain parts of the device under different operating conditions.
Figure 3:
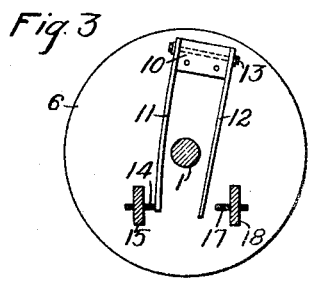

Referring to Fig. 1 to Fig. 3 of the drawings, the apparatus here shown comprises a shaft 1 upon which a pinion 2 is mounted between suitable bearings or journals 3 and 4 to mesh with a main driving gear-wheel 5, such as may be mounted upon the jackshaft of an electric locomotive. An inertia disk 6 is slidably mounted upon the shaft 1 and is provided with a spring contacting device 7 which is adapted to be associated with a current-collecting apparatus 8, under normal conditions, in the manner illustrated in Fig. 2.

The spring contacting device 7 comprises an insulating block 10 that is rigidly secured to the inertia disk 6 near the periphery thereof for the purpose of carrying a pair of flat springs or resilient members 11 and 12 which are electrically connected together and mechanically secured to opposite ends of the insulating block 10 by means of a bolt 13. An adjustable screw member 14 normally has one end in contact with the spring member 11 and extends through a lug or projection 15 that is preferably integrally formed with a spider or sleeve 16 that is rigidly mounted upon the shaft 1. A similar and alined screw member 17 normally contacts with the spring member 12 and is carried in a lug or projection 18 that is preferably integrally formed with a slip-ring 19, which is embedded in a suitable insulating collar or disk 20 that tightly incloses the spider 16.

In this way, the lug 15 and, therefore, the contact spring 11, are normally electrically connected to the shaft 1 and are thus grounded, whereby the lug may conveniently be made the negative terminal of a suitable supply circuit (not shown). On the other hand, the other lug 18 and, therefore, the contact spring 12, are normally connected to the slip ring 19, whereby ready electrical connection through a suitable circuit to the positive terminal of a storage battery or other source of supply may be effected.

The inertia disk 6 is thus free to rotate upon the shaft 1 within the limits of deflection of either of the flat springs 11 and 12. Whenever the pinion 2 is rotated, by reason of movement of the jack-shaft gear-wheel 5, the inertia disk 6 is caused to rotate by reason of the pressure of either of the screw members 14 and 17 upon the corresponding flat spring, in accordance with the direction of rotation of the shaft 1. If the rate of acceleration of the pinion is sufficiently high, the contact screw 14 or the contact screw 17, dependent upon which one is active, will exert a pressure on the corresponding spring member great enough to materially deflect or bend the spring. If the pressure reaches a predetermined amount, the deflection of the spring in question becomes sufficiently great to cause the other spring member to become disengaged from its contact screw, as illustrated in Fig. 3.

In other words, the inertia of the disk 6, in the event of a relatively rapid rate of acceleration of the shaft 1, is such as to cause the disk to lag behind the shaft to such a degree that the angular position assumed by the contacting device 7, as illustrated in Fig. 3, is sufficient to cause the flat spring 12 to break contact with the contact screw 17. Differently stated, my spring contacting device 7 is adapted to resiliently follow the movement of a wheel during a certain normal range of accelerating rates and to effect the desired restorative functions upon the occurrence of an accelerating rate outside of said range causing complete cessation of such resilient following movement, that is, causing the entire separation of the spring contacting device from the one or the other contact screw 14 and 17. The mechanical design and constants of the device should be such that the condition just mentioned obtains immediately upon the slipping of a driving wheel, and this rupture of electrical contact is employed for governing electric circuits to eliminate the slippage and restore normal conditions, as will be explained in connection with Fig. 4.

Figure 4:
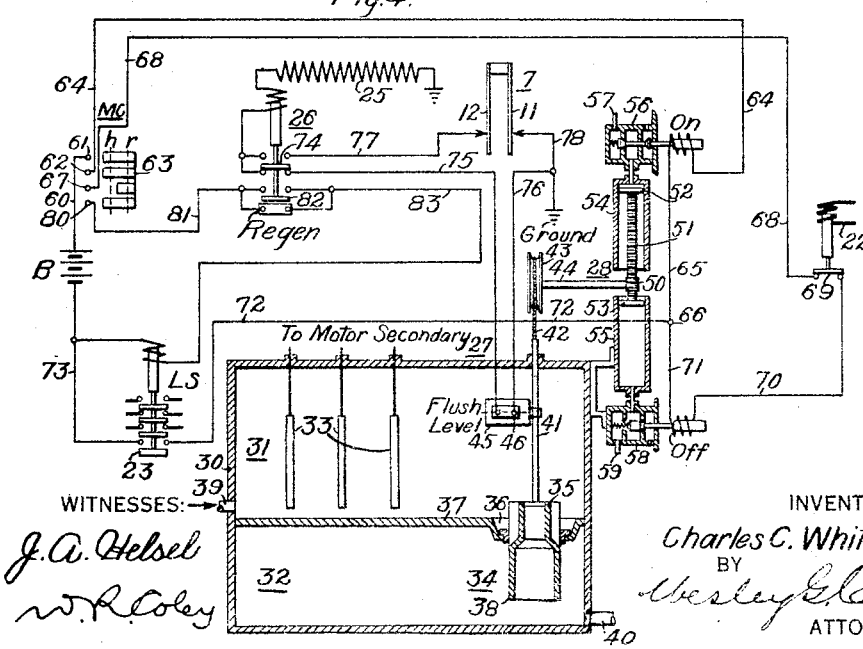
Fig. 4 is a diagrammatic view of a control system that is adapted to coöperate with my slip-arrester for the desired purpose.

Referring to Fig. 4, the system here shown comprises a small-capacity transformer 25, such as the familiar control and lighting transformer upon a locomotive, an interlocking relay device 26 for governing the operation of a line switch LS and of a liquid rheostat 27 having an operating mechanism 28, which is, in turn, controlled by my slip-arrester, as indicated by the illustration of the contacting device 7. For primarily controlling the operation of the system, a master controller MC, having operating positions $h$ and $r$, respectively corresponding to "hold" and "raise" conditions of the electrolyte in the liquid rheostat 27, is employed.

The interlocking of the illustrated control circuits is such that, whenever the locomotive is accelerating or running, the liquid rheostat will automatically return to the normal or flush-level position, that is, the position of maximum resistance, if the main motor primary or line switches, represented by LS, are dropped out by reason of the action of the slip-arrester contacting device 7 and the interlocking relay 26.

As indicated by the legend "To motor secondary," the liquid rheostat 27 is adapted for use in connection with a three-phase rotor, such as that of a wound-rotor type of induction motor. In a corresponding manner, the line switch LS is represented as controlling the three-phase primary circuits of the driving induction motor. However, it will be understood that my invention is not so limited in its application, as will be pointed out, for example, in connection with Fig. 5.

The liquid rheostat 27, in general, is of a familiar type, and is shown as comprising a containing case or tank 30 that is divided into an upper electrode-containing compartment 31 and a lower discharge or reservoir compartment 32. A plurality of electrodes 33 are located in the upper compartment and are respectively connected to the proper phase points of the induction-motor secondary winding, as indicated by the legend "To motor secondary."

A combined regulating and discharge valve 34, preferably of the type set forth in Patent No. 1,300,383, granted to Arthur J. Hall on April 15, 1919, and assigned to the Westinghouse Electric & Manufacturing Company, is employed for the purpose of adjusting the level of the electrolyte in the compartment 31. In general, the valve 34 comprises an upper hollow cylindrical section 35, of materially smaller diameter than the discharge opening or well 36 in the floor 37 of the electrode-containing compartment, and a lower hollow cylindrical section 38 that is adapted to just fit within the opening 36. Consequently, when the liquid rheostat occupies its illustrated "flush-level" or initial electrically active position, electrolyte is permitted to continuously flow from an inlet pipe or passage 39 into the upper compartment 31, around the valve section 35 into the discharge reservoir 32 and thence, through outlet pipe 40, to a suitable pumping device (not shown), in accordance with a familiar practice.

The actuating shaft or rod 41 for the valve 34 also carries an interlocking plate or board 45 bearing a contact segment 46 that is employed for circuit-controlling purposes to be hereinafter set forth. The upper end of the rod 41 may conveniently terminate in a rope or cable 42 which passes over a pulley or sheave 43 that is mounted upon the operating shaft 44 of the actuating mechanism 28.

The mechanism 28 is of a familiar electrically-controlled pneumatically-actuated type and comprises a pinion 50 that is rigidly mounted upon the shaft 44 to mesh with a transversely movable rack member 51, the opposite ends of which constitute pistons 52 and 53 that respectively travel in operating cylinders 54 and 55. A normally closed valve 56 of the double-beat type prevents communication from a source of fluid under pressure (not shown) through an inlet pipe 57 unless an actuating coil On is energized; whereas a normally open valve 58 of the double-beat type normally admits fluid, under pressure, through an inlet pipe 59 to the operating cylinder 55, and such fluid communication is prevented only by the energization of an actuating coil Off. In this way, the apparatus 28 normally occupies the illustrated biased position, corresponding to the "flush-level" position of the liquid rheostat.

The mechanical operation of the actuating mechanism 28 may be set forth as follows. Upon concurrent energization of both actuating coils On and Off, the initial fluid-pressure conditions in the mechanism are reversed, that is, fluid under pressure is admitted through the valve 56 to the operating cylinder 54, while fluid is exhausted through the valve 58 from the other cylinder 55 to the atmosphere. Consequently, movement of the pistons 52 and 53 toward the lowermost position and, therefore, movement of the pulley 43 to raise the valve 34, occurs. As soon as the upper edge of the lower cylindrical section 38 of the valve occupies the discharge opening 36, the liquid level in the rheostat rises to a plane slightly above the upper edge of the valve 34, and the excess liquid is discharged downwardly through the hollow valve member. This position of the valve corresponds to a liquid level a certain height above the "flush-level" position, and the tips of the electrodes 33 are adapted to be further immersed under these conditions. The motor secondary circuit thus includes therein an amount of liquid resistance somewhat less than the maximum value corresponding to "flush-level" position.

To arrest such movement of the pistons 52 and 53 and of the valve 34 at any time, it is only necessary to deënergize the off coil, whereupon balanced high-pressure fluid conditions obtain in the actuating device to produce a positive and reliable stoppage thereof. In the illustrated system, a current relay or limit switch 22 is adapted to govern the circuit of the off coil, whereby movement of the valve 34, effecting gradual further immersion of the electrodes 33, is responsive to current conditions in the motor, in accordance with a familiar practice.

To effect the return movement of the actuating apparatus at any time, the coils On and Off are concurrently deënergized, whereupon fluid-pressure conditions in the apparatus revert to the original state and the desired return movement is produced.

Assuming that it is desired to effect normal operation of the driving motor or motors (not shown), the procedure given below may be followed. It will be understood that the present control circuits are shown in a simplified diagrammatic form and that any other method of starting the motor into operation may be employed.

Assuming further that the auxiliary transformer 25 is energized and that the rheostat occupies its illustrated "flush-level" position, a circuit is established from one terminal of the transformer through the actuating coil of the interlocking relay 26, contact disk 74 thereof in its lower or deënergized position, conductor 75, contact segment 46 of the interlocking plate 45 of the liquid rheostat and conductor 76 to ground. The interlocking relay 26 is thus energized and is consequently lifted to its upper position, whereupon a holding circuit for the actuating coil thereof is completed from the lower terminal of the coil through contact disk 74 in the upper position, conductor 77, contact springs 12 and 11 of the contacting device 7 of my slip-arrester in its normal position and conductor 78 to ground.

Upon movement of the master controller MC to its final position $r$, another circuit is established from the positive terminal of the battery through conductor 60, control fingers 61 and 80, which are bridged by contact segment 63 of the master controller, conductor 81, contact disk 82 of the interlocking relay 26 in its upper position, conductor 83 and the actuating coil of the line switch LS to the negative battery terminal.

Upon the closure of the line switch, a circuit is established from the positive terminal of the battery B through conductor 60, control fingers 61 and 62, which are bridged by contact segment 63 of the master controller MC, conductor 64, "on" magnet of the actuating mechanism 28 and conductor 65 to junction-point 66, while a second circuit is established from the contact segment 63 through control finger 67, conductor 68, contact disk 69 of the current relay 22 in its lower position, conductor 70, "off" magnet and conductor 71 to junction-point 66, whence a common circuit is completed through conductor 72, interlock 23 of the line switch LS, in its closed position, and conductor 73 to the negative battery terminal.

Since both actuating coils of the operating mechanism 28 are thus concurrently energized, movement thereof occurs to produce an increase in liquid level in the rheostat 27.

Under normal operating conditions, that is, as long as the vehicle wheels do not slip, a gradual increase in the liquid level in the rheostat 27 is effected under the control of the current relay 22. However, in the event of slipping of a vehicle wheel, the contacting device 7 is actuated in the previously-described manner to interrupt the circuit traced above, namely, the holding circuit for the interlocking relay 26 which, therefore, drops to its illustrated lower position. Such movement of the relay device interrupts what may be termed the tripping circuit through the contact disk 82 and deënergizes the actuating coil of the line switch LS, which, consequently, drops to its open position.

The opening of the line switch interrupts the common return circuit for the "on" and the "off" magnets through interlock 23 of the line switch. Hence, the actuating mechanism 28 immediately returns toward its illustrated normal position to insert a gradually increasing resistance into the rotor circuit of the slipping motor which, as is well known, tends to eliminate the slipping conditions by correspondingly reducing the speed of the driving motor.

In this way, immediately upon the initial occurrence of slippage conditions in any motor, the corresponding slip-arrester opens the line switch and inserts a resistor in the rotor circuit of the slipping motor. Furthermore, the line switch cannot again be closed until "flush-level", or the position of maximum resistance, has been reached in the liquid rheostat, when the contact segment 46 again becomes effective to respectively control the circuits for the actuating coils of the interlocking relay 26 and of the line switch LS.

Thus, by suitable adjustment of the contact springs and screws in the slip-arrester, any ordinary rate of acceleration below the slipping-point of the driving wheels will not deflect the springs sufficiently to open the holding circuit for the interlocking relay 26; but the instant that relatively rapid movement of the driving wheels or, in other words, slipping thereof occurs, the above-described preventive action is put in force, and the corresponding motor is re-connected to the circuit only when the maximum resistance position of the liquid rheostat has been reached, thus precluding a continuance or immediate repetition of the slipping conditions in that particular motor.

The liquid rheostat will again be automatically controlled by the current relay 22 to exclude resistance from the motor secondary circuit as rapidly as permissible without requiring any special attention upon the part of the train operator, unless he desires to arrest the movement at any point. In such a case, the master controller may be returned to its position $h$, which deënergizes the "off" magnet only and thus produces the previously-mentioned balanced high-pressure conditions in the actuating mechanism 28.

It will be understood that the preventive action set forth above is not desirable during regenerative operation of the vehicle motors, since, in that case, the retarding effort of the skidding locomotive is not sufficient to hold the train back, and such effort should be aided by the application of brakes on another locomotive which is not regenerating or by an application of the airbrakes on the skidding locomotive. Consequently, the slip-arrester should be rendered inoperative during the regenerative period. This result may be accomplished by the use of an interlock marked "Regen." which bridges the tripping disk 82 of the interlocking relay 26 when the locomotive motors are regenerating. This interlock may be placed on a switch that is employed only during regeneration, or on a suitable portion of a master controller, as will be understood.

Figure 5:
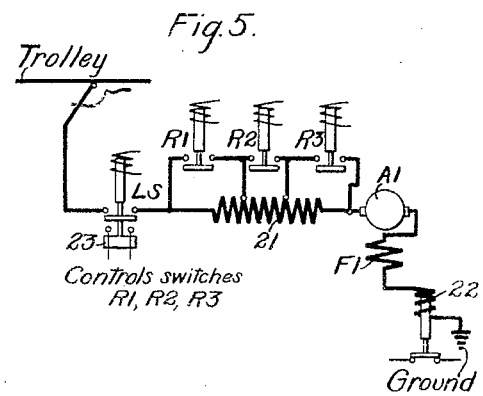
Fig. 5 is a diagrammatic view of another type of control system to which my invention is also applicable.

My invention may also be readily applied to the prevention of slippage of direct-current railway motors, as will be understood from an inspection of Fig. 5, wherein is shown a series motor having an armature A1 and a field winding F1 together with an accelerating resistor 21 that is adapted to be short-circuited in sections by switches R1, R2 and R3, and a line switch LS, energy being derived from the customary supply-circuit conductors Trolley and Ground.

In this case, the slip-arrester may be employed to directly control the circuit of the actuating coil for the line switch LS, whereby, upon the initial occurrence of slippage conditions, the line switch is opened to thereupon effect the opening of the resistor short-circuiting switches R1, R2 and R3, as indicated by the corresponding legend. In this way, the resistor 21 is inserted in circuit with the slipping motor to eliminate the slippage conditions and restore the normal operation of the machine.

Referring to Fig. 6, the structure shown illustrates the general location of my preferred form of slip-arrester in an electric locomotive. The view illustrates a locomotive wheel 90, a jack-shaft gear-case 91 and the preferred form of my slip-arrester 92.

The jack-shaft 93 of the locomotive is rigidly connected to a crank arm 94 to effect rotation of the driving wheels, such as 90, through the agency of a connecting rod 95. The jack-shaft may be driven by a gear-wheel 96 that meshes with the driving motor pinions (not shown), and this gear-wheel further meshes with a pinion 109 in the slip-arrester 92, as hereinafter more fully set forth. The pinion 109 is housed in a two-part casing 98 which is secured by bolts 99 to a supporting bracket or frame 100 which, in turn, may be bolted or otherwise fastened to any suitable portion of the locomotive truck frame, as will be understood without complete illustration. A liner or layer 102 of insulating material, such as cement, is interposed between the slip-arrester 92 and the top plate 103 of the gear case 91.

The slip-arrester 92 comprises the supporting bracket or frame 100, which is shown in detail in Figs. 9 and 10; a rear or inner housing 104, which is shown in detail in Figs. 11 to 14, inclusive; a front or outer housing 105, which is shown in detail in Figs. 15 to 18, inclusive; a current-collecting mechanism 106, which is shown in detail in Figs. 19 to 25, inclusive; an inertia disk 107; a spring contacting device 108 that is interposed between the inertia disk 107 and the current-collecting device 106; and a driving pinion 109 that is disposed between the housings 104 and 105.

Referring to Figs. 9 and 10, the supporting bracket 100 comprises a rear plate or base 110 which is suitably apertured for permitting bolted connection with the truck frame and a plurality of integral sloping webs or ribs 111, 112 and 113, together with a perpendicular rib 113$^a$, which terminate in a front plate 114, of general arcuate shape, having an internal opening 115 of relatively large size and a plurality of peripheral apertured lugs 116, 117 and 118.

The rear or inner housing 104, shown in detail in Figs. 11 to 14, inclusive, comprises a semi-circular plate or disk member 120 having a plurality of large bolt lugs 121 and smaller bolt lugs 121$^a$ for purposes to be hereinafter set forth. The housing is also provided with a centrally located apertured hub 122 on the rear side, together with a number of stiffening ribs or webs 120$^a$.

The hub 122 incloses one end of the slip-arrester shaft 123, a suitable ball bearing 124 being interposed therebetween. A cap or end covering 126 incloses the rear face of the hub 122, being secured thereto by means of a plurality of bolts 127.

The front or outer gear housing 105, shown in detail in Figs. 15 to 18, inclusive, comprises a semi-circular plate or wall 128 having stiffening ribs 129 and small peripheral bolt lugs 130. A circular wall or web 131 is located on the outer face of the housing, being substantially tangent to the lower straight edge thereof, and is likewise provided with a plurality of apertured bolt lugs 133 for a purpose to be hereinafter set forth. Moreover, the central portion of the housing member is provided with an apertured boss or circular seat 132 having a plurality of bolt-receiving lugs 134.

For the purpose of supplying oil or other lubricant to the shaft 123, which passes through the boss 132, a screw plug 131$^a$ is provided near the upper side of the circular wall 131 similarly to a screw plug 126$^a$ in the other hub 122. A suitable ball-bearing 125 is disposed between the shaft 123 and the boss member 132. The rear side of the housing 105 embodies a central hub 135 for receiving the shaft 123, which hub is stiffened by means of a plurality of ribs or webs 136.

A plurality of sets of bolts and nuts 99 pass through the large bolt lugs 121 on the gear housing 104 and through lugs 116, 117 and 118 on the supporting bracket 100 to secure the two-part gear housing, as a whole, to the supporting bracket. A number of smaller bolts 138 extend through the smaller bolt lugs 121$^a$ and 130 to secure the two gear-housing members 104 and 105 together and thus suitably inclose the gear-wheel or pinion 109, as clearly shown in Fig. 8.

A cylindrical shell or casing 140 serves to inclose and protect the parts 106, 107 and 108, and is secured by bolts 141$^a$, passing through lugs 141, to the outer gear housing 105. A spring-closed lid or cover 142 is employed to close an opening in a side wall of the casing 140 that is located opposite the current-collecting member 106, thus permitting ready inspection, etc. As an additional support for the shaft 123, a collar 144 is secured by bolts 145 to the front side of the outer housing 105.

The current-collecting device 106 comprises a sleeve member 150 (shown in section in Fig. 24) having a lug or projection 151 extending downwardly toward the left, as viewed in Fig. 7 and Fig. 25. A collector ring or band 152 incloses the sleeve 150, being suitably insulated therefrom by means of a ring of cement 153, or the like, and is provided with a complementary lug or projection 154 which extends downwardly toward the right as illustrated in Figs. 7 and 25.

A bent flat spring or metallic strip 155 has one end secured by rivets 156 to a portion of the lug 151 of the sleeve 150, the strip extending upwardly from the rivets and then reversing and extending downwardly to a point considerably below the rivets. An adjusting screw or contact 157 extends through an opening near the lower hooked end of the strip 155 and is threaded into, and extends through, the lug 151. The screw 157 may thus be adjusted by temporarily pressing the spring 155 away from the screw-head, which is held in the adjusted position by the lower end of the spring.

In a complementary manner, a second flat spring or metallic strip 158 is secured to the upper end of the lug 154 on the collector ring 152 by means of rivets 159, and a contact screw 160 extends through an opening near the lower hooked end of the strip 158 into and through the lug 154.

A brush-holder device 171 is located adjacent to the collector ring 152 and comprises a brush box or frame 172 in which a suitable carbon brush 173 or the like is adapted to travel, being biased toward engagement with the collector ring 152 by means of a suitable flat adjustable spring 174, in accordance with a familiar general construction. The brush-holder is secured, near its respective ends, to the end cap 140 by means of bolts 175 and 176, as clearly shown in Fig. 20. The bolt 175 extends through a wing or tab 177 of the brush-holder into a boss 178 of the end cap 140, being suitably insulated therefrom, while the bolt 176 extends through a corresponding wing or tab 179 into, and is insulated from, a second boss 180. A suitable contact clip 181 is secured in electrical engagement with the tab 179, and a conductor 182 is soldered thereto to effect suitable connection with an external circuit and eventually to the positive terminal of a battery or other suitable source.

The spring contacting device 108 comprises an insulating block 185 which is secured by a bolt 186 near the upper side of the inertia disk 107, while a pair of contact springs 187 and 188 are disposed on opposite faces of the block 185, being electrically secured together and mechanically fastened to the block by means of a laterally-extending bolt 190. The lower or free ends of the contact springs are respectively disposed in engagement with the contact screws 157 and 160, as clearly shown in Fig. 7. The degree of pressure normally exerted upon the contact springs by the screws 157 and 160 may be readily adjusted by turning the screws and causing them to travel, in the one or in the other direction, through the threaded openings in the lugs 151 and 154, respectively. The screws are then held in the adjusted positions by the springs 155 and 158, respectively. To preclude any possibility of the contact springs touching the shaft 123 during the period of extreme spring deflection, an insulating sleeve 189 is placed around the shaft between the inertia disk 107 and the current-collecting device 106.

In a manner similar to that illustrated in Fig. 1, the inertia disk 107 is loosely mounted on the sleeve 123, being prevented from sliding off the end of the shaft by means of a suitable cotter pin 191.

It will be observed, therefore, that the preferred construction of my slip-arrester follows out the general principles set forth in connection with the simplified apparatus shown in Fig. 1, since the conductor 182 is connected through the brush-holder 171, the collector ring 152, the lug 154 and the contact screw 160 to the contact spring 188, whereas the other contact spring 187 is grounded or connected to the negative side of the battery circuit through the contact screw 157, lug 151 on the shaft sleeve 150 and thence through the shaft 123.

The operation of the preferred form of my invention will be readily comprehended from its analogy to that set forth in connection with Fig. 1. Normally, the contact springs 187 and 188 engage the screws 157 and 160, respectively, during the rotative movement of the pinion 109 from the jackshaft gear wheel 96. Consequently, the electrical circuit, traced through the contacting spring device 7 of Fig. 4, will be maintained by the corresponding contacting spring device 108 of the preferred form of my slip-arrester.

However, upon the occurrence of slippage conditions in the motor corresponding to any given slip-arrester, the inertia of the disk 107 causes its movement to lag behind the increased rate of movement of the pinion 109 and the current-collecting device 106, whereupon the one or the other of the flat springs 187 and 188 is deflected sufficiently to cause the other spring to leave its contact screw, similarly to the structure shown in Fig. 3, whereby the electrical circuit governed by the slip-arrester is interrupted, with the results previously set forth in connection with Fig. 4, to eliminate the slippage conditions and restore normal operation.

I do not wish to be restricted to the specific structural details, circuit connections or arrangement of parts herein set forth, as various modifications thereof may be made without departing from the spirit and scope of my invention. I desire, therefore, that 13 only such limitations shall be imposed upon my invention as are indicated in the appended claims.

I claim as my invention:

1. The combination with a vehicle driving wheel, of inertia means embodying a resilient driving and current-carrying member and responsive to a certain change in the velocity of said wheel for obviating such change.

2. The combination with a vehicle driving wheel, of mechanically actuated means for effecting certain restorative functions immediately upon a predetermined change in the accelerating rate of said wheel, said means embodying a combined driving and current-carrying member.

3. The combination with a vehicle driving wheel, of means resiliently following the movement of said wheel during a predetermined range of accelerating rates for effecting certain restorative functions upon the occurrence of an accelerating rate outside of said range, causing complete cessation of such resilient following movement.

4. The combination with a vehicle driving wheel, of a member driven synchronously therewith, and inertia means separably associated with said member for effecting certain restorative functions upon the occurrence of a predetermined rate of acceleration of said wheel causing separation of said means and said member.

5. The combination with a vehicle driving wheel, of a member driven synchronously therewith, and means loosely associated with said member and embodying a flexible engaging element whereby said means closely follows the movement of said member and maintains engagement therewith throughout only a certain operating range thereof.

6. The combination with a vehicle driving wheel, of a member driven synchronously therewith, inertia means loosely mounted on said member, and means for resiliently driving said inertia means from said member.

7. The combination with a vehicle driving wheel, of a member driven synchronously therewith, means loosely mounted on said member and embodying a spring device, and a plurality of insulated members carried by said driven member and respectively engaging opposite sides of said spring device.

8. The combination with a vehicle driving wheel, of a member driven synchronously therewith, an inertia member loosely carried on said driven member, a double-spring contact device secured to said inertia member, and a plurality of contact members respectively connected with and insulated from said driven member and operatively located on opposite sides of said double-spring contact device.

9. The combination with a dynamo-electric machine, of inertia means embodying a resilient driving and current-carrying member and responsive to a certain change in the velocity of said machine for causing said member to interrupt a machine circuit.

10. The combination with a dynamo-electric machine, of resiliently actuated current-carrying inertia means dependent upon the machine velocity for effecting an interruption of an electric circuit governing said machine.

11. The combination with a dynamo-electric machine, of means resiliently following the movement of the machine rotor during a predetermined range of accelerating rates for effecting the interruption of a machine circuit upon the occurrence of an accelerating rate outside of said range causing complete cessation of such resilient following movement.

12. The combination with a dynamo-electric machine, of a member driven synchronously therewith, and inertia means separably associated with said member for effecting an interruption of the machine circuit upon the occurrence of a predetermined rate of acceleration of said machine causing separation of said means and said member.

13. The combination with a dynamo-electric machine, of a member driven synchronously therewith, means loosely mounted on said member and embodying a spring device, and a plurality of insulated members carried by said driven member and respectively engaging opposite portions of said spring device to maintain the machine circuit closed until a predetermined accelerating rate is reached.

14. The combination with a dynamo-electric machine, of a member driven synchronously therewith, an inertia member loosely carried on said driven member, a double-spring contact device secured to said inertia member, and a plurality of contact members respectively connected with and insulated from said driven member and located on opposite sides of said contact device to effect an interruption of the machine circuit when a predetermined rate of acceleration is attained.

15. The combination with a dynamo-electric machine circuit, of a relay device for controlling said circuit, and inertia means embodying a resilient driving and current-carrying member and responsive to the accelerating rate of the machine for governing said relay device by said member.

16. The combination with a dynamo-electric machine circuit, of a relay device for controlling said circuit, and inertia means responsive to the accelerating rate of the machine and embodying contact means connected in a "holding circuit" for said relay device.

17. The combination with a dynamo-electric machine circuit, of a relay device for controlling said circuit, a member rotating synchronously with the machine, inertia means loosely mounted on said member, and a spring contact device carried by said inertia means for opening a "holding" circuit for said relay device upon the occurrence of a predetermined rate of machine acceleration.

18. The combination with a dynamo-electric machine circuit, of a relay device for controlling said circuit, a variable resistor for governing the machine operation, inertia means responsive to the accelerating rate of the machine for governing said relay device, and means dependent upon the active amount of said resistor for preventing further control of the machine circuit after said inertia means has caused the relay device to operate.

19. The combination with a dynamo-electric machine circuit, of a switch for closing said circuit, a relay device for controlling said switch, a variable resistor for governing the machine operation, inertia means responsive to the accelerating rate of the machine and embodying contact means connected in a "holding" circuit of the relay device, and interlocking means for preventing reclosure of said switch after being opened by the relay device unless all of said resistor is included in circuit.

20. A slip-arrester for locomotives comprising a supporting frame, a pair of housings secured thereto, a gear-wheel disposed between said housings and a shaft carried thereby, an inertia disk loosely mounted on said shaft, and a driving device interposed between said gear-wheel and said disk.

21. A slip-arrester for locomotives comprising a pair of coöperating housings, a gear-wheel disposed between said housings and a shaft carried thereby, an inertia disk loosely mounted on said shaft, a spring device secured to said disk, and means for driving said disk through said spring device in either direction.

22. A slip-arrester for locomotives comprising a pair of coöperating housings, a gear-wheel disposed between said housings, and a shaft carried thereby, an inertia disk loosely mounted on said shaft, and a double-spring device secured to said disk, an electrical contact device mounted on said shaft and having two insulated portions engaging opposite portions of said spring device.

23. A slip-arrester for locomotives comprising a pair of coöperating housings, a gear-wheel disposed between said housings and a shaft carried thereby, an inertia disk loosely mounted on said shaft, a double-spring device secured to said disk, a sleeve member attached to said shaft and normally engaging one spring, and a collector ring insulatedly inclosing said sleeve member and normally engaging the other spring.

24. A slip-arrester for locomotives comprising a shaft, a gear-wheel rigidly secured thereto and an inertia disk loosely mounted thereon, a contact device carried by said disk, a coöperating adjustable contact member rigid with said shaft, and resilient means for maintaining said contact member in any adjusted position.

25. A slip-arrester for locomotives comprising a shaft, a gear-wheel rigidly secured thereto and an inertia disk loosely mounted thereon, a contact device carried by said disk, a contact-holding member mounted on said shaft, a contact screw extending through said member to engage said device, and a resilient member attached to said contact-holding member to engage the screw-head and maintain it in any adjusted position.

26. The combination with a vehicle driving wheel, of a member driven synchronously therewith, inertia means loosely mounted on said member and embodying a spring device, and means for driving said inertia means through said spring device and for making electrical contact therewith.

27. The combination with a dynamo-electric machine, of a member driven synchronously therewith, inertia means loosely mounted on said member and embodying a spring device, and means for driving said inertia means through said spring device and for including said device in a controlling circuit for said machine.

In testimony whereof, I have hereunto subscribed my name this 26th day of January 1920.

CHARLES C. WHITTAKER.